(No Model.)
DE WITT LOOMIS.
TRUCK FOR STREET CARS.
No. 540,068. Patented May 28, 1895.
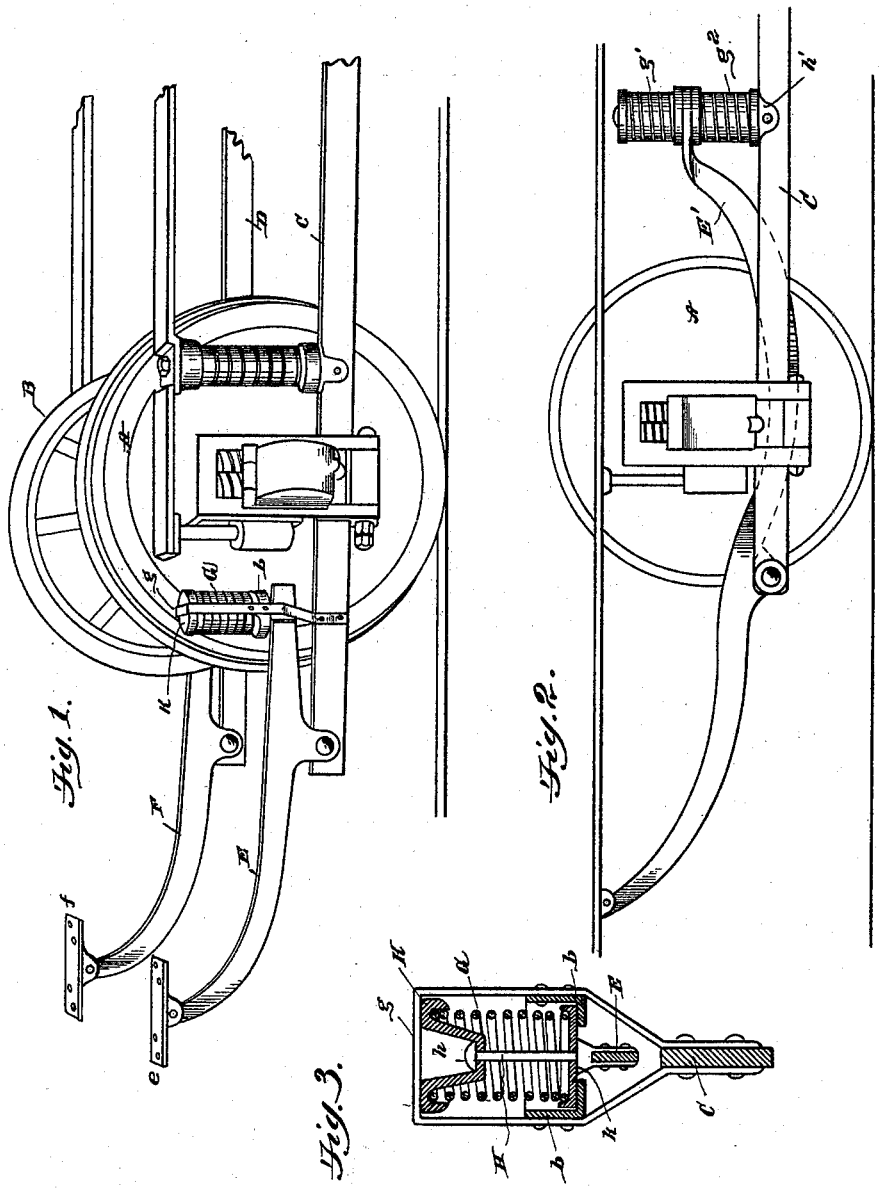
WITNESSES
INVENTOR
By Attorneys.

UNITED STATES PATENT OFFICE.

DE WITT LOOMIS, OF DETROIT, MICHIGAN.

TRUCK FOR STREET-CARS.

SPECIFICATION forming part of Letters Patent No. 540,068, dated May 28, 1895.

Application filed January 7, 1895. Serial No. 534,012. (No model.)

*To all whom it may concern:*

Be it known that I, DE WITT LOOMIS, a citizen of the United States, residing at Detroit, county of Wayne, State of Michigan, have invented a certain new and useful Improvement in Trucks for Street-Cars; and I declare the following to be a full, clear, and exact description of the invention, such as will enable others skilled in the art to which it pertains to make and use the same, reference being had to the accompanying drawings, which form a part of this specification.

This invention relates to improvements in the truck frame for supporting the bodies of street cars, and it consists in certain features of construction by which the extreme outer ends of the car body are supported on levers that equalize both the downward and upward thrust against spring tension located on the car truck.

In the drawings, Figure 1 shows the half of a truck-frame embodying my invention. Fig. 2 shows in elevation a slightly-modified construction. Fig. 3 is a detail of the spring connection used that enables me to equalize against both the upward and downward thrust.

As is well known, the ordinary street car body is mounted on a very short truck, and overhangs the wheels on either end for a long distance, and is apt to rock or teeter whenever the wheels pass over any inequality, or often when the car is running rapidly; and it is the object of this invention to overcome this rocking motion or teeter motion to as great an extent as possible.

A and B indicate a pair of wheels of the ordinary truck.

C and D indicate the side bars of the truck which yoke the two pairs of wheels together and form the principal part of the truck frame. On the bars C and D, I hinge two levers E and F, one on each side of the truck frame, and extending outward toward the end of the car, terminating at the end with bearing plates $e f$, upon which the end of the car body rests and is secured. At the inner end of each of the levers E and F is a spring, one of which, G, is shown in Fig. 1, and this spring is arranged to compress into a state of tension, both when the inner end of the lever is raised and when it is lowered—that is, whichever motion is communicated to the lever E produces the same compressing motion on the spring G. This result is attained by arranging the end of the lever E to bear directly against a plate $k$ supporting the under side of the spring G and press it upward against a reversed stirrup $g$, when the inner end of the lever E is raised. A pin H extending from the end of the lever E upward centrally through the spring G, and terminating with the head $h$, engages in a cup or stirrup shaped bearing K that engages the opposite end of the spring G. A downward thrust on the inner end of the lever E, acting through the pin H and the cup or stirrup K, compresses the spring G against the bearings $b$ on the stirrup $g$, thus affording a compressing action upon the spring G in whichever direction the levers E and F are rocked. This, in effect, transfers the spring G from the central position to the outer end of the car body, and tends to counteract the rocking action of the car body on the truck frame.

In the form shown in Fig. 2, the same result is accomplished by almost identical means, the only difference being that, instead of the single spring G, I use two springs $g' g^2$, supported on a standard $h'$ secured to the truck frame, one of the springs being above the terminal of the lever E', and the other below the terminal, so that, with the downward thrust, one of the springs is compressed, and with the upward thrust, the other is compressed, the result being identical and the means substantially the same as that shown in Fig. 1.

It of course is to be understood that the two ends of the truck frame are provided with exactly similar levers, and that the location of the fulcrum and the spring may be reversed so as to obtain the same result.

What I claim is—

1. In a running gear for street cars, the combination of a truck frame having side bars, levers of the first order fulcrumed at the outer ends of said side bars and having the outer ends of said levers engaging the outer ends of the car body, and double acting springs, held by said side bars, at a point midway between the car axle and fulcrum point of said levers, substantially as and for the purpose described.

2. In a running gear for street cars, the combination with a truck frame, levers of the first order hinged to the outer end of said frame and having their outer ends engaging the outer ends of the car body, and double vertically acting springs supported by said frame and engaging the inner ends of said levers, substantially as described.

3. In a running gear for street cars, the combination of a truck frame having the side bars D. and C., a lever of the first order hinged at the outer end of one of said side bars and having the outer end engaging the outer end of the car body, the stirrup $g$, supported upon said side bar having the bearing $b$, secured thereto, the spring G, supported upon said bearing, the cup K, engaging the upper end of said spring, and the rod H, having one end secured to the inner end of said lever and the opposite end secured to said cup, substantially as and for the purpose described.

In testimony whereof I sign this specification in the presence of two witnesses.

DE WITT LOOMIS.

Witnesses:
CHARLES F. BURTON,
F. CLOUGH.